Figure 1:
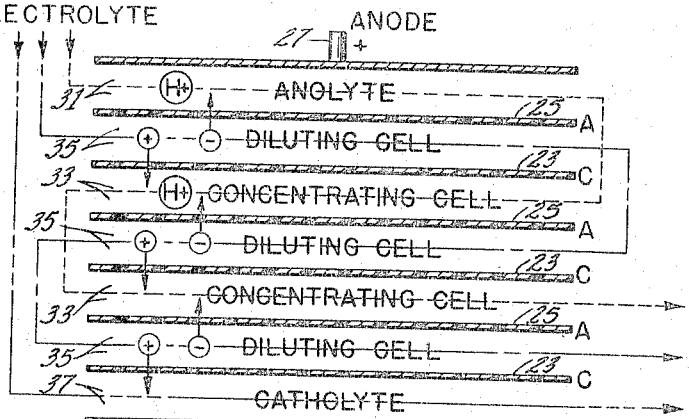

INVENTOR.
MILTON S. MINTZ
BY
William A. Drucker
ATTORNEY

INVENTOR.
MILTON S. MINTZ
BY William A. Drucker
ATTORNEY 3,318,788
METHOD OF FORMING ACID IN CONCENTRATING CHAMBERS OF ELECTRODIALYSIS APPARATUS
Milton S. Mintz, Birmingham, Ala., assignor to American Machine & Foundry Company, a corporation of New Jersey
Continuation of application Ser. No. 734,991, May 13, 1958. This application Oct. 24, 1962, Ser. No. 233,499
3 Claims. (Cl. 204—130)

This application is a continuation of application Ser. No. 734,991, filed May 13, 1958, now abandoned.

This invention relates to multiple chamber electrodialysis devices and to the structure and operation of these devices. More particularly, the invention relates to the introduction of acid produced during operation of the device into the concentrating chambers.

Multiple chamber electrodialysis devices have been developed to change ionic concentration in fluids by passing a direct electric current across a cell or container which is divided into dialysing compartments by alternate positive and negative ion exchange membranes. Although various ion-solvent systems can be treated in this equipment, the usual system consists of water and an ionizable salt dissolved therein. The membranes usually are arranged in pairs of alternate positively and negatively or anionic (anion) and cationic (cation) permselective sheets. The membranes may also be wound into a spiral and electrodes provided at the core and circumference of the spiral cross section.

Alternate membrane compartments disposed between a single pair of electrodes constitute a stack. Several stacks or stages are often advantageously hydraulically connected. The electrodes of each stack or stage are contained in chambers. The positive electrode, or anode chamber contains a fluid called the anolyte. The negative electrode or cathode chamber contains a fluid called the catholyte.

In the operation of multiple chamber electrodialysis devices, it has commonly been found that the pH of fluid in the concentrating compartments tends to rise relative to that of the diluting compartment. Hydroxyl ions migrate from the catholyte toward the anode via intervening cells. Hydroxyl ions are also produced in the concentrating compartments of such cells during some types of polarization. The increased alkalinity leads to precipitation of salts, particularly calcium and magnesium, on the membrane surfaces in these compartments. These salts interfere with the operation and may coat or plug the membrane. It has been proposed as a correction to this effect to add a small amount of a dilute acid to the system at these areas from an acid supply outside the system.

It is an object of this invention to overcome salt precipitation, plugging and coating in concentrating compartments of a multi-chamber electrodialysis device.

It is also an object of the invention to provide a method of acidifying the concentrating chambers of an operating multi-chamber electrodialysis device without adding any materials from a source external to the cell.

Figure 2:
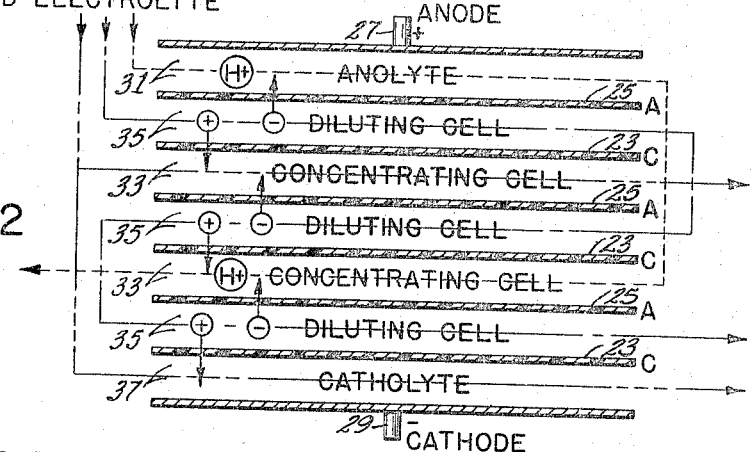

These and other objects of the invention are described in the following detailed account of the invention and in the attached drawing in which:

FIGS. 1 through 6 are schematic representations of electrodialysis flow patterns which show the application of the present invention to conventional cell structures. In the drawing similar elements are indicated in the different figures by the same reference characters. The indications are used:

21—first cation membrane or barrier adjacent the anode
23—cation membranes C
25—anion membranes A
27—anode
29—cathode
31—anode chamber
33—concentrating compartment
35—diluting compartment
37—cathode chamber
H+—hydrogen ion
+—cation
—anion In FIGS. 1 and 2 anolyte is fed to concentrating cells either directly in series or to a subsequent concentrating cell.

Figure 3:
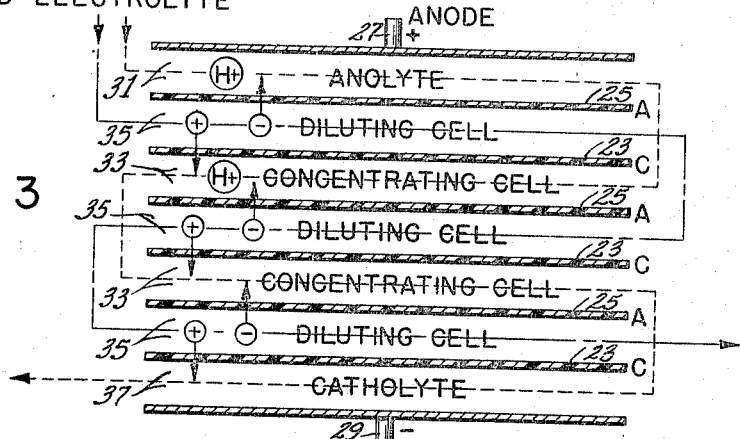

In FIG. 3 anolyte is fed through concentrating cells to the catholyte.

Figure 4:
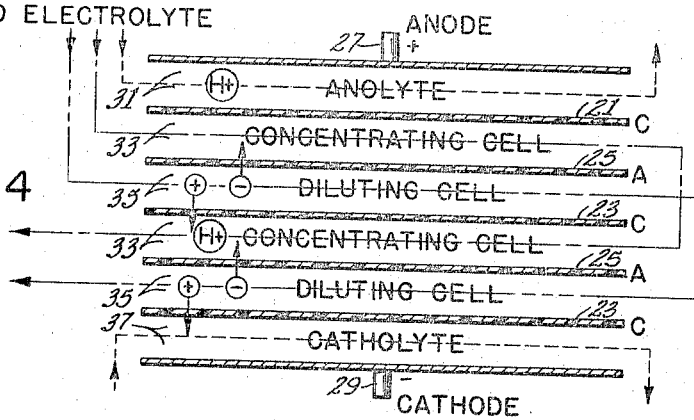
Figure 5:
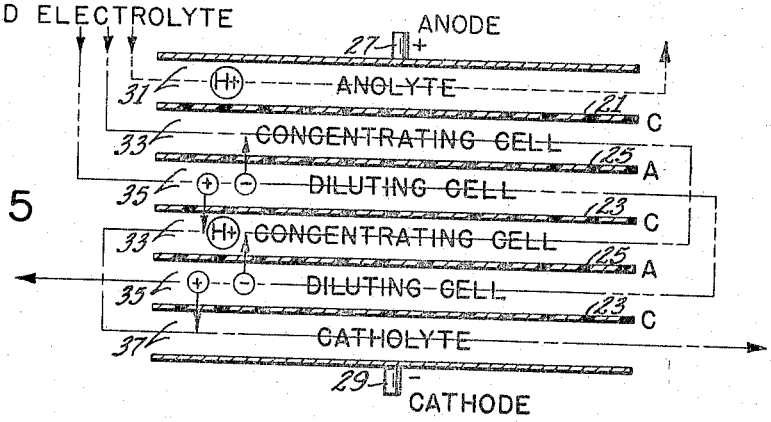

In FIGS. 4 and 5 a barrier is adjacent the anode, and hydrogen ions cross the barrier to be fed to either the concentrate stream or both the concentrate stream and the catholyte in series.

Figure 6:
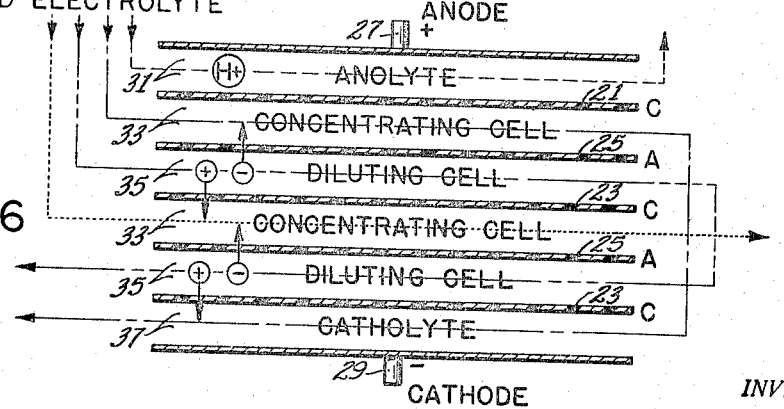

In FIG. 6 the hydrogen ions formed as in FIGS. 4 and 5 are fed directly to the cathode chamber.

According to the invention as shown in the drawing, the positive electrode chamber is joined with one or more of the concentrating compartments to allow hydrogen ions formed by electrolysis at the anode to be conveyed in the anolyte to the concentrating compartments where they inhibit salt precipitation. It thereby is possible to provide a self-regulating system without the external supply of acid materials. This decrease in pH of the concentrate stream will, on natural waters, lower the Langelier Index below a scaling value and counteract incipient polarization which might raise the pH of the concentration stream.

The invention also contemplates the use of automatic control of acidity in the concentrating chambers. A detecting device, for example an electric pH meter, continuously monitors the acidity of the concentrating compartments and a signal from the detecting device automatically regulates the supply of anolyte to these compartments by a system of valves and reservoirs.

A feature of one embodiment of the invention, as illustrated in FIGS. 4, 5 and 6, is the use of a cation or negatively charged membrane 21 immediately adjacent the positive electrode or anode 27 to form the anolyte chamber 31. With this construction hydrogen ions generated at the electrod are allowed to migrate into an adjacent concentrating compartment 33 but excluded from diluting or product stream compartments 35. A cation membrane is also more resistant to chemical attack by hypochlorite formed in the anolyte.

Use of a cation membrane, or other semipermeable barrier which may not necessarily be a selective membrane, adjacent the positive electrode also prevents the migration of electrolysis products which interfere with operation of the other parts of the cell from the anolyte 31 into other parts of the stack. In FIGS. 4, 5 and 6 the anolyte 31 is not circulated through the cell. Hydrogen ions leave the anolyte across the barrier 21 adjacent the electrode 27 and the rest of the anolyte is disposed of as a waste stream. This method of salvaging hydrogen ions from the anolyte and recirculating the acid which forms in the compartment adjacent the electrode chamber 31 is a preferred form of the invention.

Another feature of the invention as illustrated in FIG. 3 is a circuit for carrying hydrogen ions not only from the anolyte 31 to the concentrating compartment 33, but on from there to the negative electrode chamber 37 where the hydroxyl ions formed at the cathode 29 are neutralized by anolyte. This neutralization solves a waste disposal problem.

As shown in FIGS. 1 and 2, the anolyte from the positive electrode chamber 31 may be fed to concentrating compartments 33 either directly in series, or to any selected compartment.

The catholyte may also be connected to the effluent of any concentrating compartment as shown in FIG. 6.

In substance the invention embodies the use of hydrogen ions formed at the anode to neutralize basic elements in the concentrating compartments. This acidic material may be carried either by direct hydraulic connection or a semipermeable barrier may be used to separate the hydrogen ions from other elements of the anolyte. When a semipermeable barrier is used, it is preferably a cation membrane. Hydrogen ions which cross the barrier are then fed to various concentrating compartments and may ultimately be combined with the catholyte.

What is claimed is:

1. A method of controlling acidity and related scale formation in an electrodialysis system having at least two separate concentrating compartments, which comprises generating acid in an anode chamber as the only source of acid in said system, passing hydrogen ions from said anode chamber through an ion permeable barrier into an adjacent first compartment and passing anions other than hydroxyl from a second adjacent compartment through an ion permeable barrier also into said first compartment to establish a concentration of acid therein and thereafter hydraulically transferring fluid containing said acid from said first compartment directly into a remote concentrating compartment at said concentration.

2. A method according to claim 1 in which said ion permeable barrier is a cation membrane.

3. A method according to claim 1 in which said first compartment is a concentrating compartment.

References Cited by the Examiner

UNITED STATES PATENTS

| | | | |
|---|---|---|---|
| 2,860,095 | 11/1958 | Katz et al. | 204—301 |
| 3,003,940 | 10/1961 | Mason | 204—301 |

OTHER REFERENCES

Chemistry and Industry, "Desalting Water by Electrodialysis" Jan. 4, 1958, pp. 8–12.

Juda et al., "Saline Water Conversion" Proceedings of a Symposium, Nov. 4–6, 1957, p. 2F1.

Langelier, "Journal of American Water Works Association" September 1952, pp. 845–848.

JOHN H. MACK, *Primary Examiner.*

JOHN R. SPECK, *Examiner.*

J. BATTIST, R. MIHALEK, *Assistant Examiners.*